US012502309B2

(12) United States Patent
Chowers et al.

(10) Patent No.: US 12,502,309 B2
(45) Date of Patent: Dec. 23, 2025

(54) MULTI-LUMEN SYRINGES FOR INTRAOCULAR INJECTIONS

(71) Applicants: Itay Chowers, Moshav Beit Zait (IL); Tomer Batash, Lod (IL)

(72) Inventors: Itay Chowers, Moshav Beit Zait (IL); Tomer Batash, Lod (IL)

( * ) Notice: Subject to any disclaimer, the term of this patent is extended or adjusted under 35 U.S.C. 154(b) by 854 days.

(21) Appl. No.: 17/265,637

(22) PCT Filed: Aug. 5, 2019

(86) PCT No.: PCT/IL2019/050891
§ 371 (c)(1),
(2) Date: Feb. 3, 2021

(87) PCT Pub. No.: WO2020/031182
PCT Pub. Date: Feb. 13, 2020

(65) Prior Publication Data
US 2021/0298949 A1 Sep. 30, 2021

Related U.S. Application Data

(60) Provisional application No. 62/714,819, filed on Aug. 6, 2018.

(51) Int. Cl.
*A61F 9/00* (2006.01)
*A61M 5/32* (2006.01)
(Continued)

(52) U.S. Cl.
CPC ......... *A61F 9/0017* (2013.01); *A61M 5/3291* (2013.01); *A61M 5/3297* (2013.01);
(Continued)

(58) Field of Classification Search
CPC ...... A61F 9/00; A61F 9/0017; A61F 9/00736; A61M 5/3291; A61M 5/3297;
(Continued)

(56) References Cited

U.S. PATENT DOCUMENTS 3,749,088 A    7/1973   Cucchiara
3,776,238 A * 12/1973   Peyman .............. A61F 9/00763
                                                       606/171
(Continued)

FOREIGN PATENT DOCUMENTS

CN      201200536 Y    3/2009
CN      202069874 U    12/2011
(Continued)

OTHER PUBLICATIONS

Gonzalez-Chomon et al (2011) Drug Eluting Intraocular Lenses, Materials, 4:1927-1940.
(Continued)

*Primary Examiner* — Rebecca E Eisenberg
*Assistant Examiner* — Timothy L Flynn
(74) *Attorney, Agent, or Firm* — The Roy Gross Law Firm, LLC; Roy D. Gross

(57) ABSTRACT

There is provided herein a multi-lumen syringe for intraocular injection, including a first lumen, a second lumen, one or more needles fluidly connected to the lumens, and a needle sheath disposed about the one or more needles; wherein the needle sheath includes a plurality of n proximity/contact/pressure actuators on a distal rim of the needle sheath; wherein the syringe is switchable between at least two configurations: a first configuration in which at least one of the actuators is not actuated and each tip of the one or more needles is proximally positioned, and secured, relative to the distal rim; and a second configuration in which the n actuators are actuated, and the one or more needles are allowed to distally extend beyond the distal rim.

19 Claims, 5 Drawing Sheets

(51) Int. Cl.
  *G01N 21/78* (2006.01)
  *G01N 33/53* (2006.01)
(52) U.S. Cl.
  CPC ......... *G01N 21/78* (2013.01); *G01N 33/5302* (2013.01); *A61M 2005/3201* (2013.01); *A61M 2210/0612* (2013.01); *G01N 2800/16* (2013.01)
(58) Field of Classification Search
  CPC .. A61M 2005/3201; A61M 2210/0612; A61M 5/178; A61M 5/19; A61M 5/20; A61M 5/1782; A61M 5/1787; A61M 5/2066; A61M 2005/2013; A61M 2005/1787; A61M 2005/2451; A61M 2005/3132; A61M 5/31578; A61M 5/31596; A61M 5/3294; G01N 21/78; G01N 33/5302; G01N 2800/16
  See application file for complete search history.

(56) References Cited

U.S. PATENT DOCUMENTS

| | | | |
|---|---|---|---|
| 5,354,285 | A | 10/1994 | Mazurik et al. |
| 5,547,473 | A * | 8/1996 | Peyman ............... A61M 13/003 604/521 |
| 5,814,022 | A | 9/1998 | Antanavich et al. |
| 8,221,353 | B2 | 7/2012 | Cormier et al. |
| 2004/0094146 | A1 | 5/2004 | Schiewe et al. |
| 2004/0098864 | A1 | 5/2004 | Boehm et al. |
| 2007/0060887 | A1 | 3/2007 | Marsh et al. |
| 2007/0073267 | A1 | 3/2007 | Muller |
| 2008/0195033 | A1 | 8/2008 | Eagleson et al. |
| 2010/0106081 | A1 | 4/2010 | Brandeis et al. |
| 2010/0241102 | A1 | 9/2010 | Ma |
| 2010/0305514 | A1 | 12/2010 | Valenti et al. |
| 2011/0166531 | A1 | 7/2011 | Stroumpoulis et al. |
| 2011/0270220 | A1 | 11/2011 | Genosar |
| 2011/0295191 | A1 | 12/2011 | Injev |
| 2012/0078224 | A1 | 3/2012 | Lerner et al. |
| 2012/0238938 | A1 | 9/2012 | Herekar et al. |
| 2012/0277664 | A1 | 11/2012 | Macy, Jr. |
| 2014/0039456 | A1 | 2/2014 | Lerner |
| 2014/0221941 | A1 | 8/2014 | Erickson et al. |
| 2014/0221970 | A1 * | 8/2014 | Eaton ............... A61M 5/3202 141/2 |
| 2015/0038905 | A1 | 2/2015 | Andino et al. |
| 2015/0112248 | A1 * | 4/2015 | Helliwell ............ A61M 5/3134 604/32 |
| 2015/0148836 | A1 | 5/2015 | Heeren |
| 2015/0297457 | A1 | 10/2015 | Buder et al. |
| 2015/0374930 | A1 | 12/2015 | Hyde et al. |
| 2017/0119580 | A1 | 5/2017 | Tan |
| 2017/0273825 | A1 | 9/2017 | Yamamoto et al. |
| 2017/0281877 | A1 * | 10/2017 | Marlin ............... A61M 5/3234 |
| 2017/0304553 | A1 * | 10/2017 | Bender ............... A61M 5/31 |
| 2020/0129695 | A1 * | 4/2020 | Brandeis ............ A61M 5/31581 |
| 2020/0179606 | A1 * | 6/2020 | Weinstein ......... A61M 5/31578 |
| 2021/0169689 | A1 * | 6/2021 | Bley ................... A61F 9/0017 |

FOREIGN PATENT DOCUMENTS

| | | |
|---|---|---|
| JP | 2005323956 A | 11/2005 |
| JP | 2011255065 A | 12/2011 |
| JP | 2016106021 A | 6/2016 |
| JP | 2016537138 A | 12/2016 |
| KR | 20140114848 A | 9/2014 |
| RU | 2387462 | 4/2010 |
| WO | 2012012631 A1 | 1/2012 |
| WO | 2013003620 A2 | 1/2013 |
| WO | 2013098806 A1 | 7/2013 |
| WO | 2015136035 A1 | 9/2015 |
| WO | 2016033496 A1 | 3/2016 |
| WO | 2017014630 A1 | 1/2017 |

OTHER PUBLICATIONS

Tan et al (2016) Sustained Antibiotic-Eluting Intraocular Lenses: A New Approach, PLOS ONE 11(10).
Patel et al (2017) Drug Eluting Intraocular Lens, J Pharm Sci Bioscientific Res, 7(2):209-216.
Moorhead et al (2005) Dynamic Intraocular Pressure Measurements During Vitrectomy, Arch Ophthalmology, 123 (11):1514-23.
PCT Search Report International Application No. PCT/IL2019/050891; mailed Nov. 12, 2019 ; 4 pp.
PCT Written Opinion International Application No. PCT/IL2019/050891; mailed Nov. 12, 2019; 5 pp.
PCT Repliminary Report International Application No. PCT/IL2019/050891; dated Feb. 9, 2019 ; 6 pp.
McCarty WJ, Luan A, Siddiqui M, Hansen BC, Masuda K, Sah RL. Biomechanical properties of mixtures of blood and synovial fluid. J Orthop Res. Feb. 2011;29(2):240-6. doi: 10.1002/jor.21209. PMID: 21226237; PMCID: PMC3057681.—pp. 14.
Popescu SI, Munteanu M, Patoni C, Musat Ama, Dragoescu V, Cernat CC, Popescu MN, Musat O. Role of the Vitreous in Retinal Pathology: A Narrative Review. Cureus. Aug. 23, 2023;15(8):e43990. doi: 10.7759/cureus.43990. PMID: 37622058; PMCID: PMC10446244.—pp. 9.
Sebag, J. Ageing of the vitreous. Eye 1, 254-262 (1987). https://doi.org/10.1038/eye.1987.45.—pp. 9.
Vahedi S, Adam MK, Dollin M, Maguire Ji. 25-Gauge Trocar Cannula for Acute Endophthalmitis-Related In-Office Vitreous Tap and Injection: Patient Comfort and Physician Ease of Use. Retina. Apr. 2017;37(4):657-661. doi: 10.1097/IAE.0000000000001201. PMID: 27471824.—pp. 5.
Weitoft T, Uddenfeldt P. Importance of synovial fluid aspiration when injecting intra-articular corticosteroids. Ann Rheum Dis. Mar. 2000;59(3):233-5. doi: 10.1136/ard.59.3.233. PMID: 10700435; PMCID: PMC1753098.—pp. 3.
Jerome Vincent Giovinazzo, Michael Jansen, Codrin Iacob, Richard B Rosen, Avnish Deobhakta; Obtaining Vitreous Samples in Acute Endophthalmitis: Comparing the Rate of Dry Taps Using a Needle vs Trocar Cannula. Invest. Ophthalmol. Vis. Sci. 2018;59(9):3673.—pp. 3.
Gisladottir S, Loftsson T, Stefansson E. Diffusion characteristics of vitreous humour and saline solution follow the Stokes Einstein equation. Graefes Arch Clin Exp Ophthalmol. Dec. 2009;247(12):1677-84. doi: 10.1007/s00417-009-1141-3. Epub Jul. 29, 2009. PMID: 19639333.—pp. 8.
Kampougeris G, Spyropoulos D, Mitropoulou A. Intraocular Pressure rise after Anti-VEGF Treatment: Prevalence, Possible Mechanisms and Correlations. J Curr Glaucoma Pract. Jan.-Apr. 2013;7(1):19-24. doi: 10.5005/jp-journals-10008-1132. Epub Jan. 15, 2013. PMID: 26997776; PMCID: PMC4741123.—pp. 6.
Lam LA, Mehta S, Lad EM, Emerson GG, Jumper JM, Awh CC; Task Force on Intravitreal Injection Supplemental Services. Intravitreal Injection Therapy: Current Techniques and Supplemental Services. J Vitreoretin Dis. Jul. 22, 2021;5(5):438-447. doi: 10.1177/24741264211028441. PMID: 37008713; PMCID: PMC9976140.—pp. 10.
Springer, B. L., & Pennington, B. M. (2017). Joint Arthrocentesis in the Emergency Department. Emergency Medicine Reports, 38(19).
Stephens, M. B., Beutler, A. I., & O'Connor, F. G. (2008). Musculoskeletal injections: a review of the evidence. American family physician, 78(8), 971-976.
Barker, J., Clasen, J., Cruz-Aguado, R., De Villiers, C., Gonzalez-Torres, L. R., Guppy, L. J., . . . & Tautorus, C. (2019). Douglas College Human Anatomy & Physiology II. 1203, Chapter 26.
Wilson, M. E., & Scott, A. W. (2013). How to give intravitreal injections. EyeNet Magazine, 45-47.

* cited by examiner

MULTI-LUMEN SYRINGES FOR INTRAOCULAR INJECTIONS

This application is a National Phase of PCT Patent Application No. PCT/IL2019/050891 having International filing date of Aug. 5, 2019, which claims the benefit of priority of U.S. Provisional Patent Application No. 62/714,819, filed Aug. 6, 2018, the contents of which are all incorporated herein by reference in their entirety.

TECHNICAL FIELD

The present disclosure relates generally to syringes for intraocular injections.

BACKGROUND

Intravitreal drug delivery is a common procedure for treating various retinal diseases, including age-related macular degeneration (AMD), diabetic retinopathy, and retinal vein occlusions. The use of intravitreal injections has significantly increased since the introduction of anti-vascular endothelial growth factor (anti-VEGF) medications. Currently, intravitreal injections are one of the most commonly performed medical procedures. In the United States alone more than 6 million were performed in 2016.

There is still a need in the art for improved, safer, and more reliable intravitreal injections devices and methods.

SUMMARY

Aspects of the disclosure, according to some embodiments thereof, relate to syringes for intraocular injections. More specifically, but not exclusively, aspects of the disclosure, according to some embodiments thereof, relate to multi-lumen syringes for intraocular injections and/or drawing of intraocular substances.

According to an aspect of some embodiments, there is provided a multi-lumen syringe for intraocular injection and/or drawing of intraocular substances, wherein the syringe includes a first lumen, a second lumen, one or more needles fluidly connected to the lumens, and a needle sheath disposed about the one or more needles, wherein the syringe is switchable between at least two configurations:
  A first configuration in which each tip of the one or more needles is proximally positioned, and secured, relative to the distal rim; and
  A second configuration in which the one or more needles can distally extend beyond the distal rim,
wherein the first needle and/or second needle may be fenestrated in the tip and/or on the shaft, thus creating one or more entry or exiting ports to the first and/or second needle. The tip of the needle may only function as a blade to pierce through the eye and the port/ports allowing entrance/exit of substance through the needle can be in the shaft and not at the tip. In particular, according to some such embodiments, this may allow the tip to be narrower and thereby sharper, as compared to an open (and hollow) tip (which is configured to deliver fluid therethrough).

According to an aspect of some embodiments, there is provided a multi-lumen syringe for intraocular injection and/or drawing of intraocular substances. The syringe includes a first lumen, a second lumen, one or more needles fluidly connected to the lumens, and a needle sheath disposed about the one or more needles. The needle sheath includes a plurality of n proximity/contact/pressure actuators on a distal rim of the needle sheath. The syringe is switchable between at least two configurations:
  A first configuration in which at least one of the actuators is not actuated and each tip of the one or more needles is proximally positioned, and secured, relative to the distal rim.
  A second configuration in which the n actuators are actuated, and the one or more needles can distally extend beyond the distal rim.

According to some embodiments, a plane defined by the distal rim of the needle sheath is perpendicular, or substantially perpendicular, to the one or more needles, thereby ensuring that when all, or substantially all, of the distal rim contacts a surface of an eye, such as to actuate the n actuators, the one or more needles are insertable perpendicularly to the surface of the eye.

According to some embodiments, the syringe is configured to automatically switch back from the second configuration to the first configuration, thereby ensuring that, after insertion of the one or more needles, if the syringe is tilted such that the distal rim no longer fully, or substantially fully, contacts the surface of the eye, injection or withdrawal of fluids is no longer possible.

According to some embodiments, the actuators are push-buttons, and in the second configuration the push buttons are pushed in beyond a threshold extent.

According to some embodiments, in at least one pair of actuators, from the n actuators, the actuators are oppositely or substantially oppositely positioned on the distal rim, thereby helping to ensure that even when n=2, in the second configuration, the distal rim rests stably on the eye and the needles are positioned perpendicularly, or substantially perpendicularly, to the surface of the eye.

According to some embodiments, the actuators are contact/pressure actuators. Positions (locations) of the actuators on the distal rim are such that, when the distal rim is placed on an eye of a subject, the multi-lumen syringe cannot be switched from the first configuration to the second configuration unless all, or substantially all, of the distal rim contacts the eye (i.e. all, or substantially all, of the actuators are actuated).

According to some embodiments, the actuators are contact/pressure actuators. Positions of the actuators on the distal rim are such that, when the distal rim is placed on an eye of a subject, one or more of the plungers of the multi-lumen syringe are locked and cannot be moved (i.e. pushed and/or pulled) unless all, or substantially all, of the distal rim contacts the eye (i.e. all or substantially all, of the actuators are actuated).

According to some embodiments, the actuators, and/or other components, are further configured to measure pressure of the eye.

According to some embodiments, the one or more needles are retractable. According to some such embodiments, the needle sheath is fixed.

According to some embodiments, the needle sheath is retractable and/or compressible. According to some such embodiments, the one or more needles are fixed.

According to some embodiments, the second lumen is disposed within the first lumen.

According to some embodiments, the one or more needles include at least two needles: a first needle and a second needle. The first needle is fluidly connected to the first lumen, and the second needle is fluidly connected to the second lumen.

According to some embodiments, the second needle is disposed within the first needle.

According to some embodiments, the second lumen is adjacent to the first lumen, and the second needle is adjacent to the first needle.

According to some embodiments, the needle sheath is cylindrical.

According to some embodiments, the first needle and/or second needle are fenestrated in the tip and/or on the shaft, thus creating one or more entry or exiting ports to the first and/or second needle. Fenestration may refer to opening(s) in the needle. According to some embodiments, the tip of the needle may only function as a blade to pierce through the eye and the port/ports allowing entrance/exit of substance through the needle can be in the shaft and not at the tip. In particular, according to some such embodiments, this may allow the tip to be narrower and thereby sharper, as compared to an open (and hollow) tip (which is configured to deliver fluid therethrough).

According to some embodiments, the first needle is fenestrated and/or the second needle is fenestrated in the sense of including side ports on respective needle shafts thereof. The side ports allow for entry or exit of fluid therethrough.

According to some embodiments, the first needle comprises one or more cutting elements and/or the second needle comprises one or more cutting elements.

According to some embodiments, at least some of the cutting elements are configured for motion in or on the respective needle.

According to some embodiments, the first needle is fenestrated and includes one or more first needle side ports on a first needle shaft. The second needle includes one or more second needle cutting elements thereon, which are positioned adjacently to respective side ports from the first needle side ports.

According to some embodiments, one or more of the first needle cutting elements are configured to for motion within the respective second needle side ports, such as to cut substance adjacent to the second needle side ports, when the needles are inserted into an eye of a subject.

According to some embodiments, the first needle and second needle are configured for relative motion therebetween.

According to some embodiments, the relative motion includes oscillatory motion, reciprocating motion, back-and-forth transverse motion, rotations, vibrations, or any combination thereof of the first needle and/or the second needle.

According to some embodiments, the first needle and/or second needle are configured for motion. According to some embodiments, the first needle and/or second needle along with each of their respective lumens or sub-lumens are configured for motion. According to some embodiments, such motion may include oscillatory motion, reciprocating motion, back-and-forth transverse motion, rotations, vibrations, or any combination thereof of the first needle and/or the second needle.

According to some embodiments, the cutting elements may be fixed within the first and/or second needle, such that the relative motion between the first and/or second needle generates a cutting effect.

According to some embodiments, pushing and/or pulling the first plunger and/or the second plunger actuates cutting elements included in/on the first needle and/or second needle.

According to some embodiments, at least some of the cutting elements are fixed on the respective needles so that pushing and/or pulling the first plunger and/or the second plunger may induce a cut motion of the fixed cutting elements.

According to such embodiments, at least some of the cutting elements, which are fixed on the second needle, are positioned adjacently to side ports on the first needle, so that pushing and/or pulling the first plunger and/or the second plunger induces cutting motion thereof (of the cutting elements fixed on the second needle) in/through the side ports.

According to such embodiments, at least some of the cutting elements, which are fixed within the first needle, are positioned adjacently to side ports on the second needle, so that pushing and/or pulling the first plunger and/or the second plunger induces cutting motion of the cutting elements in/through the side ports.

According to some embodiments, a radius of the distal rim is between about 3 mm and about 4 mm. The syringe is configured such that, when a user brings the distal rim against an eye of a subject, the distal rim is visible to the user, thereby facilitating insertion of the one or more needles at between about 3 mm and about 4 mm from a limbus in the eye.

According to some embodiments, the needle sheath, or the one or more needles, may include an extension/marker (for example, a circumferential extension such as a flange or a band (e.g. a silicone band)). The extension defines a distance of between about 3 mm and about 4 mm from the one or more needles. The syringe is configured such that, when a user brings the distal rim against an eye of a subject, the extension is visible to the user, thereby facilitating insertion of the needles at between about 3 mm and about 4 mm from a limbus in the eye. According to some such embodiments, the extension/marker may be coated with a protective material (such as silicon or any other material known in the art) which may come into contact with the cornea without causing damage to the cornea and/or the conjunctiva, due to exposure to the material or sheer forces induced by the contact, thereby decreasing the risk of erosive damage (or any other type of damage due to exposure to/contact with the extension/marker) to the cornea and/or conjunctiva. The extension/marker may be designed to contact or be relatively close to the eye. The extension/marker may act as a stabilizer when it contacts the eye as it extends the syringe's base contacting the eye, thus minimizing possible tilting of the syringe.

According to some embodiments, the needle sheath, when compressed, defines a distance of between about 3 mm and about 4 mm from the one or more needles. The syringe is configured such that, when a user brings the distal rim against an eye of a subject, the needle sheath is compressed, thereby facilitating insertion of the one or more needles at a distance of between about 3 mm and about 4 mm from a limbus in the eye. According to some such embodiments, the needle sheath may be coated with a protective material (such as silicon or any other material known in the art) which may come into contact with the cornea without causing damage to the cornea and/or the conjunctiva, due to exposure to the material or sheer forces induced by the contact, thereby decreasing the risk of erosive damage (or any other type of damage due to exposure to/contact with the needle sheath) to the cornea and/or conjunctiva.

According to some embodiments, the respective distances between adjacent actuators from the plurality of actuators are equal or substantially equal.

According to some embodiments, the distal rim is oval or elliptical.

According to some embodiments, a proximal end of the needle sheath is joined to a distal end of the second lumen.

According to some embodiments, the syringe further includes a first plunger, configured for reciprocal motion within the first lumen, and a second plunger, configured for reciprocal motion within the second lumen.

According to some embodiments, the second lumen is disposed within the first lumen, and the second plunger is disposed within the first plunger.

According to some embodiments, the first plunger and the second plunger are functionally associated such that pushing or pulling the first plunger induces a counter motion of the second plunger, and/or pushing or pulling the second plunger induces a counter motion of the first plunger.

According to some embodiments, the syringe is configured to allow controllably switching between at least two modes of operation in the second configuration:
  a free-motion mode wherein the first plunger and the second plunger can be moved independently of one another; and
  at least one counter-motion mode wherein the first plunger and the second plunger are functionally associated such that pushing or pulling the first plunger induces a counter motion of the second plunger, and/or pushing or pulling the second plunger induces a counter motion of the first plunger.

According to some embodiments, the at least one counter-motion mode includes at least two counter-motion modes:
  a first counter-motion mode wherein a volume change in the first lumen due to a motion of the first plunger causes an opposite-sign and equal magnitude change in volume in the second lumen due to the induced motion of the second plunger and vice-versa; and
  a second counter-motion mode wherein a volume change in the first lumen due to a motion of the first plunger causes an opposite sign and different magnitude change in volume in the second lumen due to the induced motion of the second plunger and vice-versa.

According to some embodiments, the first plunger is configured such as to prevent pushing and/or pulling thereof beyond a threshold pushing velocity of the first plunger and/or a threshold pulling velocity of the first plunger.

According to some embodiments, the second plunger is configured such as to prevent pushing and/or pulling thereof beyond a threshold pushing velocity of the second plunger and/or a threshold pulling velocity of the second plunger.

According to some embodiments, at least one of the plungers is configured to allow injecting fluid only after another one of the plungers has been pulled to withdraw a (predetermined) amount of eye fluid.

According to some embodiments, the syringe includes a locking mechanism configured to prevent the first plunger from being pushed (to inject fluid) when a volume defined by the second plunger within the second lumen is smaller than a threshold volume.

According to some embodiments, the syringe includes a locking mechanism configured to prevent the second plunger from being pushed (to inject fluid) when a volume defined by the first plunger within the first lumen is smaller than a threshold volume.

According to some embodiments, the syringe includes a locking mechanism configured to allow the first plunger to be pushed (to inject fluid) only upon indication that the second plunger was shifted to a pulled configuration (to ensure that fluid was drawn from the eye prior to injection).

According to some embodiments, the syringe includes a locking mechanism configured to allow the second plunger to be pushed (to inject fluid) only upon indication that the first plunger was shifted to a pulled configuration (to ensure that fluid was drawn from the eye prior to injection).

According to some embodiments, at least one of the plungers is configured to allow withdrawing eye fluid only after another one of the plungers has been pushed to inject a (predetermined) amount of fluid.

According to some embodiments, the syringe includes a locking mechanism configured to prevent the first plunger from being pulled (to withdraw fluid) when a volume defined by the second plunger within the second lumen is greater than a threshold volume.

According to some embodiments, the syringe includes a locking mechanism configured to prevent the second plunger from being pulled (to withdraw fluid) when a volume defined by the first plunger within the first lumen is greater than a threshold volume.

According to some embodiments, the syringe includes a locking mechanism configured to allow the first plunger to be pulled (to withdraw eye fluid) only upon indication that the second plunger was shifted to a pushed configuration (to ensure that fluid was injected into the eye prior to withdrawal).

According to some embodiments, the syringe includes a locking mechanism configured to allow the second plunger to be pulled (to withdraw eye fluid) only upon indication that the first plunger was shifted to a pushed configuration (to ensure that fluid was injected into the eye prior to withdrawal).

According to some embodiments, the locking mechanism may be enabled or disabled, thereby allowing independent motion of each of the plungers.

According to some embodiments, the syringe is configured to allow insertion of the one or more needles into an eye of a subject at a pre-determined speed and/or pressure or at a pre-determined range of speeds and/or pressures.

According to some embodiments, the syringe may be coupled via the plungers, lumens, sub-lumens, and/or any combination thereof to a system (e.g. station) configured to control operation and functions of the syringe. According to some such embodiments, the system is configured to generate positive or negative pressures within the lumens or the sub-lumens of the syringe, and thereby mobilize the plungers and induce the lumens and/or the sub-lumens to withdraw fluid from, and/or inject substance into, an eye of a subject. According to some such embodiments, the system may be configured to control the speed of the insertion of the needles, the force of the insertion, and the pressure of injected fluids.

According to some embodiments, in the second configuration the tips of the one or more needles are restricted from distally extending beyond about 1 cm relative to the distal rim of the needle sheath.

According to some embodiments, the first lumen is partitioned, at least along a section thereof, into two or more first lumen sub-lumens.

According to some embodiments, each of the first lumen sub-lumens is associated with a respective plunger. The first needle is partitioned into sub-needles. Each of the sub-needles is fluidly connected to one of the first lumen sub-lumens, respectively.

According to some embodiments, the second lumen is partitioned, at least along a section thereof, into two or more second lumen sub-lumens.

According to some embodiments, each of the second lumen sub-lumens is associated with a respective plunger. The second needle is partitioned into sub-needles. Each of the sub-needles is fluidly connected to one of the second lumen sub-lumens, respectively.

According to some embodiments, wherein the first lumen includes a plurality of first lumen sub-lumens and/or the second lumen comprises a plurality of second lumen sub-lumens, two or more the sub-lumens are fluidly-associable with a common lumen. According to some such embodiments, the syringe further includes a valve system (e.g. including one-way valves) configured to fluidly decouple, or controllably fluidly decouple, at least some of the sub-lumens which are fluidly-associable with the common lumen.

According to some embodiments, each of the tips of the one or more needles is beveled and lies on a second plane. An angle between the second plane and the plane defined by the distal rim is acute.

According to some embodiments, in the first configuration, pushing and/or pulling of the plungers is disabled.

According to some embodiments, the first needle is fenestrated and/or the second needle is fenestrated.

According to some embodiments, the first needle includes one or more cutting elements and/or the second needle includes one or more cutting elements.

According to some embodiments, at least some of the cutting elements are configured for motion in or on the respective needle.

According to some embodiments, the first needle is fenestrated and includes one or more first needle side ports on a first needle shaft. The second needle includes one or more first needle cutting elements thereon, which are positioned adjacently to respective side ports from the second needle side ports.

According to some embodiments, one or more of the first needle cutting elements are configured to for motion within the respective second needle side ports, such as to cut substance adjacent to the second needle side ports, when the needles are inserted into the eye of a subject.

According to some embodiments, the first needle and second needle are configured for relative motion there between.

According to some embodiments, the relative motion includes oscillatory motion, reciprocating motion, back-and-forth transverse motion, rotations, vibrations, or any combination thereof of the first needle and/or the second needle.

According to some embodiments, the syringe is disposable and can be replaced after each use, or at least some removable components of the syringe are disposable and can be replaced after each use. Disposable elements may include, for example, needle(s), the syringe lumen(s) or sub-lumen(s) or the entire syringe.

According to some embodiments, the syringe, for example, in one or more of the lumens or sub-lumens thereof, may include at least one substance facilitating rapid analysis of eye-fluid through an interaction with the eye-fluid.

According to some embodiments, the rapid analysis may be facilitated by an indicator substance and/or an Enzyme-Linked Immunosorbent Assay (ELISA) and/or chemical pads, located in the syringe's lumen(s)/sub-lumen(s) or on a wall of a lumen(s)/sub-lumen(s), for the detection of one or more intraocular substances, such as, but not limited to, vascular endothelium growth factors levels, interleukin 6 levels and TNF levels. In addition, the analysis may include testing for the presence of one or more substances including, but not limited to, proteins, glucose, ketones, hemoglobin, acetone, nitrites, leukocytes, pH and specific gravity to test infection of various pathogens.

According to some embodiments, the syringe may include chemical(s) (located, for example, in the syringe's lumen (s)/sub-lumen(s)) that are configured to react with compounds present in the ocular substances producing a characteristic color. The change in color may provide qualitative results that only determine if the sample is positive or negative, or semi-quantitative results that, in addition to providing a positive or negative reaction, also provide an estimation of a quantitative result. In the latter, the colors obtained by the reactions correlate (e.g., essentially proportionally) to the concentration of the substance being tested for in the sample.

Semi-quantitative values may be presented to a user, for example as: trace, 1+, 2+, 3+ and 4+, although tests results may also be presented as milligrams per deciliter, etc. Automated readers (for example, but not limited, in mobile (e.g. handheld) computational devices, realized as an application on a smartphone, in cameras, in a desktop computer, or stand-alone apparatuses) may also provide/present results.

According to some embodiments, the automated readers are functionally associated with computerized systems configured for storing and analyzing the results and giving interpretation and results to the user.

According to some embodiments, the rapid analysis may include an indicator substance and/or an Enzyme-Linked Immunosorbent Assay (ELISA) and/or chemical pads. According to some embodiments the rapid analysis may include an indicator substance based on paper-based ELISA as is known in those familiar with the art.

According to some embodiments, there is provided a station for injecting and/or drawing fluid from an eye of a subject. The station includes:

A housing including a monitor.
A controller.
A control circuitry which may be distributed between the housing and the controller.

The housing includes one or more tube ports for one or more corresponding tubes, and one or more wire ports for one or more corresponding wires. The station is configured to be connected via the one or more tubes and the one or more wire ports to a syringe for intraocular injection, such as, but not limited to, the multi-lumen syringes described above, as well as single lumen-syringes. The station being thereby configured to control one or more functions and/or operational parameters of the syringe.

According to some embodiments, the controller is included in the housing.

According to some embodiments, the housing includes a docking station for the controller.

According to some embodiments, the tubes and/or wires are disposable.

According to some embodiments, the tubes and/or wires form an integral part of the station.

According to some embodiments, the control circuitry is configured to allow switching between the configurations and the modes of the syringe.

According to some embodiments, the operational parameters include a volume of injected/withdrawn fluid, a force applied to insert the needle, a speed of the insertion of the needle, a rate of injection/fluid withdrawal, which lumens are operational and which are not during a use of the syringe, which lumen is to be used for injection and which lumen is to be used for withdrawal.

According to some embodiments, the functions and parameters can be controlled by controller accessories, buttons located on the tubes, the wires, and/or the syringe.

According to some embodiments, the controller accessories include a foot pedal.

According to some embodiments, the station is configured control pressures within the lumens/sub-lumens, and thereby move the plungers at pre-determined speeds a pre-determined range of speeds and inject substance into an eye of a subject, and withdraw therefrom, fluids at pre-determined rates.

According to some embodiments, the station is configured to control relative motion of the needle(s) and/or motion of the cutting elements.

According to some embodiments, the housing and and/or the tubes include at least one substance facilitating rapid analysis of an eye-fluid through an interaction of the substance with the eye-fluid.

According to some embodiments, the monitor is configured to display analyzed data, from the rapid analysis of eye-fluid, in a qualitative, semi-quantitative, and/or quantitative format.

According to some embodiments, the control circuitry further includes at least one computer processor configured to analyze sensor readings from sensors positioned in the syringe and/or the tubes, and optionally a memory configured to store results of the analysis.

According to some embodiments, the computer processor is further configured to provide a diagnosis based on the sensor readings.

According to some embodiments, the monitor may be configured to display the analysis results and optionally the diagnosis.

According to some embodiments, the station further includes a support structure including a height-adjustable mount configured to support the housing, and a base, from which the height-adjustable mount extends, and which supports the height-adjustable mount.

According to some embodiments, the station is mobile. According to some such embodiments, wherein the base is mounted on wheels.

According to some embodiments, the station may include a transmitter and/or receiver configured to transmit and/or receive readings to/from a remote station (e.g., another station or a server/cloud).

According to some embodiments, the remote station may be configured to communicate with the local station, to store data, analyze data of a given reading and/or compares given reading to previously obtained reading of a remote station or a plurality of remote stations, and/or to transmit the data to the station.

According to an aspect of some embodiments, there is provided herein a multi lumen syringe as disclosed herein, wherein one or more of the lumens or sub-lumens are pre-loaded with a substance. Such substance may include a fluid, such as, but not limited to, a fluid including a drag, saline solution, etc. Such substance may also include a material configured for use for analysis of fluids withdrawn from the eye.

According to an aspect of some embodiments, there is provided herein a method for injecting and/or withdrawing fluid to/from the eye. The method includes utilizing a multi lumen syringe as disclosed herein, in accordance with some embodiments. The method includes:
   approaching/contacting an eye of a subject with a distal tip of the syringe, wherein the distal tip of the syringe may refer to a distal tip of at least one of the needles (for example, but not limited to, standard needles, fenestrated needles, and/or needles including cutting elements) and/or a distal rim of a sheath surrounding the needle(s);
   optionally, contacting an eye of a subject with the distal rim, switching from a first configuration (in which each tip of the one or more needles is proximally positioned, and secured, relative to the syringe's distal rim) to a second configuration (in which the one or more needles can distally extend beyond the distal rim) by bringing distal rim against the eye surface;
   inserting at least one of the needles into the eye;
   pulling a first plunger of the syringe to withdraw fluid from the eye;
   pushing a second plunger of the syringe to insert fluid to the eye; and
   wherein the two latter steps may be performed simultaneously or successively and in any order.

According to some embodiments, the method may further include functionally associating the syringe to one or more systems (e.g., local station and/or remote station, for example, as described herein), as described hereinabove, wherein the system is configured to partially or fully control operation and/or functions of the syringe or components thereof.

According to some embodiments, the method may further include analyzing (e.g., real time analysis) the fluids withdrawn from the eye.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not to scale.

In the figures.

DETAILED DESCRIPTION

Figure 1A:
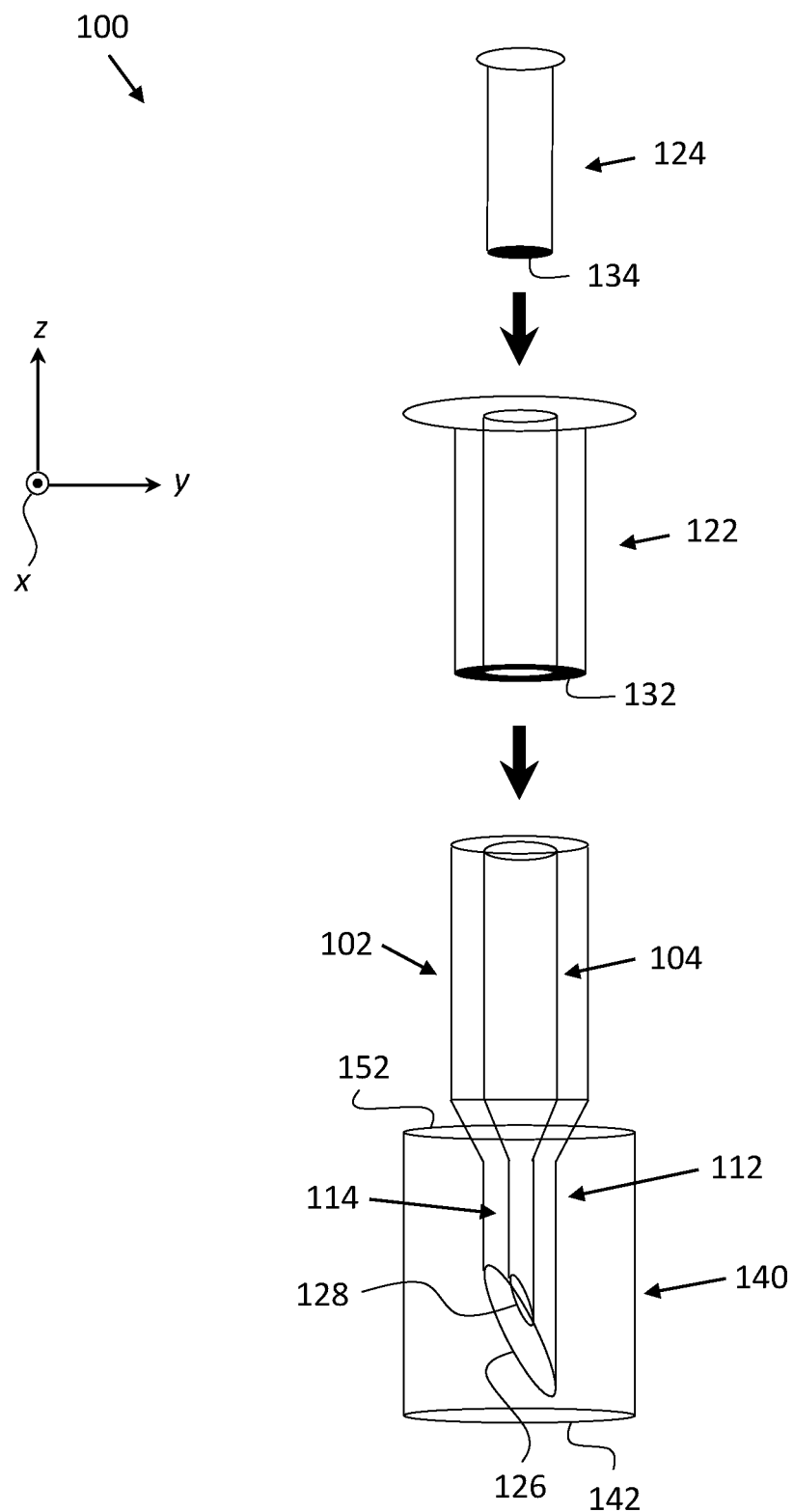
FIG. 1a is a schematic exploded view of a multi-lumen syringe, according to some exemplary embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

As used herein, according to some embodiments, the term "fluid" may refer to liquid, gel or gas. For example, "fluid" may refer to a gas, such as $CO_2$, gas carrying a drug, drug, a solution, such as a saline solution, a drug containing solution, a suspension, such as a drug particles/droplet-containing suspension, etc. According to some embodiments, the term "fluid" may also refer to the eye fluid. According to some embodiments, the term "drug" may refer to any pharmaceutically active ingredient, such as but not limited to, a compound, a combination of compounds or a composition, with or without carriers and/or excipients. The drug may be in the form of liquid, gel, dissolved/suspended particles or gas.

For ease of description, in some of the figures a three-dimensional cartesian coordinate system (with orthogonal axes x, y, and z) is introduced. It is noted that the orientation of the coordinate system relative to a depicted object may vary from one figure to another. Further, the symbol ⊙ is used in the figures to represent an axis pointing "out of the page".

As used herein, according to some embodiments, the term "longitudinal" with reference to a direction/axis, refers to a direction/axis along/parallel to/opposite to the z-axis. According to some embodiments, the term "distal" with reference to a direction, refers to a direction along the negative z-axis. According to some embodiments, the term "proximal" with reference to a direction, refers to a direction along the positive z-axis. According to some embodiments, the term "distal" with reference to a location (e.g. of an element/component) may refer to a location near or in a body of a subject, while the term "proximal" refer to a location further away from the body of the subject (relative to the distal location).

According to an aspect of some embodiments, there is provided a multi-lumen syringe. FIG. 1a is a schematic exploded view of a multi-lumen syringe 100. According to some embodiments, syringe 100 includes a first lumen 102, a second lumen 104, a first needle 112, a second needle 114, a first plunger 122, a second plunger 124, and a needle sheath 140. First needle 112 is fluidly connected to first lumen 102. Second needle 114 is fluidly connected to second lumen 104. First plunger 122 is configured for controllable reciprocal motion within first lumen 102. Second plunger 124 is configured for controllable reciprocal motion within second lumen 104.

First needle 112 includes a first needle tip 126 (at the distal end thereof). Second needle 114 includes a second needle tip 128 (at the distal end thereof). First plunger 122 includes a first plunger seal 132 (e.g. at the distal end thereof). Second plunger 124 includes a second plunger seal 134 (at the distal end thereof).

According to some embodiments, and as depicted in the figures, second lumen 104 is longitudinally disposed inside first lumen 102 along the length thereof. According to some such embodiments, first lumen 102 and second lumen 104 are concentrically disposed. According to some embodiments, and as depicted in the figures, second needle 114 is longitudinally disposed inside first needle 112 along the length thereof. According to some such embodiments, first needle 112 and second needle 114 are concentrically disposed.

An injection volume of 0.05 mL is most commonly used. The maximum safe volume to inject without pre-injection drawing of the substance is believed to be 0.1 mL to 0.2 mL. Therefore, according to some embodiments, drawing and/or injecting of the substance may be conducted in a range of 0-0.4 mL, so that the net amount is an addition or reduction of about 0.2 mL of substance from the eye.

According to some embodiments, the needle size may vary according to the substance injected, with 27-gauge needles often used for crystalline substances such as triamcinolone acetonide and 30-gauge needles commonly used for the anti-VEGF agents ranibizumab, bevacizumab, and aflibercept. Studies suggest that smaller, sharper needles require less force for penetration and result in less drug reflux. Some physicians have begun using 31-gauge needles (the size commonly used by diabetic patients to test blood sugar and inject insulin), as smaller needle size may decrease patient discomfort.

The above needle gauges are relevant for external first needle 112. As such, second needle 114 is characterized by a smaller gauge.

Needle length may be between about 0.5 and 0.62 inches (12.7 to 15.75 mm). Longer needles may increase risk of retinal injury if the patient accidentally moves forward during the procedure.

According to some embodiments, not depicted in the figures, second needle 114 is adjacent to first needle 112.

Needle sheath 140 is longitudinally disposed about first needle 112 (and second needle 114) and terminates in a distal rim 142. According to some embodiments, and as depicted in the figures, needle sheath 140 is cylindrical. According to some embodiments, distal rim 142 is oval or elliptical. According to some embodiments, and as depicted in the figures, distal rim 142 is circular. According to some such embodiments, a radius of distal rim 142 (and needle sheath 140) is between about 3 mm and about 4 mm, thereby allowing an operator of syringe 100 to reliably inject at a (recommended) distance of about 3 mm to about 4 mm from a limbus of an eye of a subject.

Figure 1B:
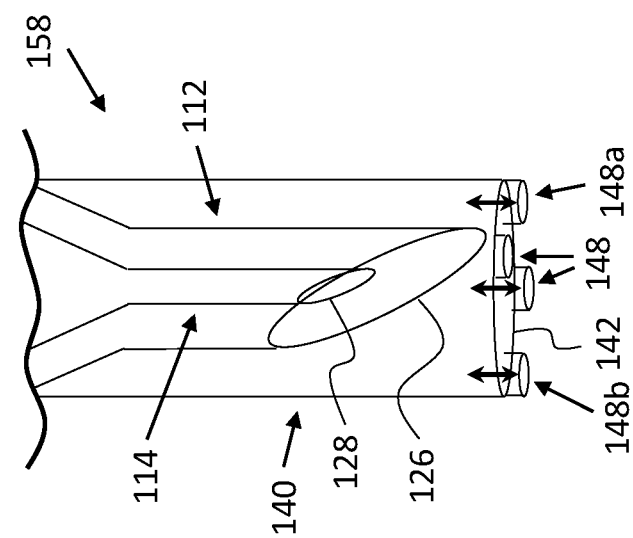
FIG. 1b schematically depicts a distal section of the multi-lumen syringe of FIG. 1a, according to some embodiments.

According to some embodiments, needle sheath 140 is connected to outer walls (not numbered) of first lumen 102. According to some embodiments, needle sheath 140 is of a greater diameter than first lumen 102, and needle sheath 140, or at least a proximal portion thereof, is configured to slide on first lumen 102. Distal rim 142 includes a plurality of n actuators 148 (shown in FIG. 1b). According to some embodiments, the distance between adjacent actuators (from actuators 148) is the same, or substantially the same, for all pairs of adjacent actuators. According to some embodiments, actuators 148 are actuated when a pressure above a pressure threshold is applied thereon. According to some such embodiments, actuators 148 include pressure sensors. According to some embodiments, actuators are actuated by contact. According to some such embodiments, actuators 148 include contact sensors. According to some embodiments, actuators 148 include proximity sensors. According to some embodiments, and as depicted in FIG. 1b, actuators 148 are push buttons and are actuated when pushed in beyond a threshold extent/level. According to some such embodiments, one or more actuators 148 or one or more dedicated sensors (located on distal rim 142) may enable to measure the intraocular pressure (for example, but not limited to, measuring proximately or relative proximately to the various ocular surfaces, i.e. the cornea or sclera) in various methods known in the art used for reading the intraocular pressure. In some embodiments, actuators 148 or one or more dedicated sensors (located on distal rim 142) may operate in a closed loop system controlling (for example, limiting) the movement of plunger 124 and/or 122 and/or total volume of matter injected and/or drawn from the eye based on the measured intraocular pressure. In some embodiments of the system, feedback to the operator may be given by presenting the eye pressure on a display unit or by sound (not shown).

Syringe 100 is controllably switchable between two configurations: a first configuration and a second configuration. In the first configuration at least m (wherein $1 \leq m \leq n-1$) of actuators 148 are not actuated (so that n-m or fewer of actuators 148 are actuated) and needle tips 126 and 128 are proximally positioned, and secured, relative to distal rim 142. That is, first needle tip 126 and second needle tip 128 are not exposed. In the second configuration, at least n-m+1 of actuators 148 are actuated (so that m-1 or fewer of actuators 148 are not actuated) and needle tips 126 and 128 may be exposed (i.e. needle tips 126 and 128 may distally extend beyond distal rim 142). Each pair of values of n and m corresponds to a separate embodiment.

According to some embodiments, in the second configuration, needles 112 and 114 and needle sheath 140 are capable of a relative motion with respect to one another (such as to allow exposing needle tips 126 and 128).

More specifically, syringe 100 is configured to switch from the first configuration to the second configuration when the number of actuators (from actuators 148), which are actuated, reaches n-m+1, and to switch from the second configuration to the first configuration when the number of actuators which are actuated drops below n-m+1.

According to some embodiments, in the first configuration at least one of actuators 148 is not actuated (i.e. m=1) and in the second configuration all of actuators 148 are actuated.

According to some embodiments, needle sheath 140 is fixed, and needles 112 and 114 are configured for longitudinal (i.e. distal and proximal) motion in the second configuration. According to some embodiments, needles 112 and 114 are fixed, and needle sheath 140 is configured for longitudinal motion in the second configuration.

According to some embodiments, needles 112 and 114 and needle sheath 140 are configured for longitudinal counter motions in the second configuration (that is, when needles 112 and 114 motion is distal, needle sheath 140 motion is proximal, and vice-versa). According to some embodiments, a proximal end 152 of needle sheath 140 is fixed and in the second configuration distal rim 142 is retractable. That is, needle sheath 140 is configured to allow compression thereof in the second configuration.

According to additional or alternative embodiments, syringe 100 may be controllably switchable between two configurations: a first configuration and a second configuration. In the first configuration at least m (wherein $1 \leq m \leq n-1$) of actuators 148 are not actuated and plungers 124 and/or 122 are locked. In the second configuration, at least n-m+1 of actuators 148 are actuated and plungers 124 and/or 122 are free to be pulled/pushed. This may ensure that no injection or withdrawal of liquid to/from the eye will be allowed unless the syringe is essentially perpendicular to the eye surface and in appropriate contact therewith.

Making reference also to FIG. 1b, FIG. 1b schematically depicts a distal section 158 of syringe 100, according to some embodiments thereof wherein actuators 148 are push-buttons.

Figure 2:
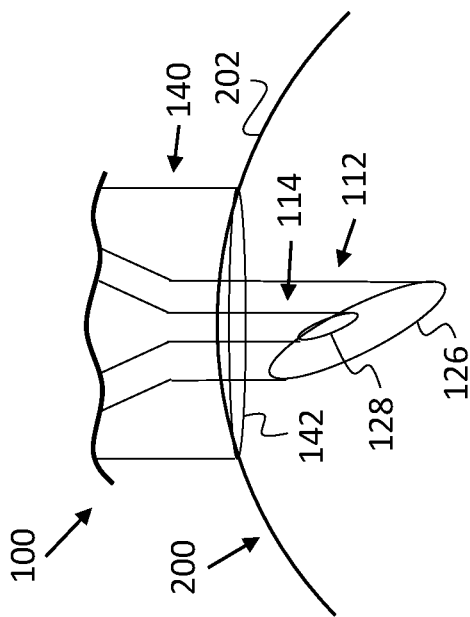
FIG. 2 schematically depicts the multi-lumen syringe of FIG. 1a with needles thereof inserted into an eye of a subject, according to some exemplary embodiments.

Making reference also to FIG. 2, FIG. 2 schematically depicts syringe 100 and an eye 200, according to some embodiments. Syringe 100 is shown with needles 112 and 114 inserted into eye 200. More specifically, distal rim 142 is shown contacting a surface 202 of eye 200 such that needles 112 and 114 are inserted into eye 200 at right angles (perpendicularly) to surface 202, which increases the safety and reliability of intraocular injections, thereby minimizing potential damage to the lens, retina and other ocular structures.

In use, syringe 100 may be switched from the first configuration to the second configuration by bringing distal rim 142 against a surface (e.g. surface 202 of eye 200) such as to actuate at least n-m+1 of actuators 148. Syringe 100 may be configured such that when distal rim 142 is brought against a flat or rounded surface (in particular, a surface of eye) with at least n-m+1 of actuators 148 being actuated, needles 112 and 114 are positioned at right angles, or substantially at right angles, to the surface.

According to some embodiments, distal rim 142 defines a plane perpendicular to needles 112 and 114, so that by bringing all of distal rim 142 into contact with a flat or rounded surface, a perpendicular positioning of needles 112 and 114 relative to the surface is ensured. According to some such embodiments, the actuation of all of actuators 148 ensures that all, or substantially all, of distal rim 142 is in contact with the surface, and that needles 112 and 114 are perpendicular, or substantially perpendicular, to the surface. According to some embodiments, at least two of actuators 148, e.g. actuators 148a and 148b in FIG. 1b, are oppositely positioned on distal rim 142 (e.g. when distal rim 142 is circular, a diameter of distal rim 142 extends between the two actuators), thereby ensuring that when the two actuators are actuated by bringing distal rim 142 into contact with the surface of an eye, needles 112 and 114 are perpendicular to the surface.

As used herein, the term "rim" (e.g. distal rim 142) may refer to both thin and wide rims. For example, according to some embodiments, a surface area of distal rim 142 may measure between about 10% to about 90% of the total area of the plane defined by distal rim 142.

According to some embodiments, distal rim 142 is configured such as to allow stable mounting thereof on surface 202. For example, the dimensions of distal rim 142 may be selected to this end and/or distal rim 142 may be made of a material, or may be coated by a material, such as to facilitate stable contact between needle sheath 140 and eye 200 when distal rim 142 is brought there against. According to some embodiments, needle sheath 140 (or at least distal rim 142) may be broader (e.g. of greater diameter) than first lumen 102, or wider at least along one axis (e.g. when distal rim 142 is oval or cylindrical) such as to facilitate greater stability of contact between distal rim 142 and surface 202.

According to some embodiments, first plunger 122 and second plunger 124 operation is independent of one another. In particular, first plunger 122 may be pushed or pulled independently of second plunger 124 position and independently of whether second plunger is pushed or pulled, and vice-versa.

According to some embodiments, pushing and/or pulling of first plunger 122 may induce a counter-motion of second plunger 124, and/or vice-versa. For example, when second plunger 124 is pushed (e.g. injecting medicament into an eye of a subject), first plunger 122 is automatically pulled back (e.g. withdrawing fluid from the eye).

According to some embodiments, syringe 100 may have a plurality of counter-motion modes and may be controllably switched there between. As a non-limiting example, in a first counter-motion mode, an increase or decrease in the first volume is accompanied by an opposite-sign and equal magnitude change in the second volume (as described above), while in the second counter-motion mode, an increase or decrease in the first volume is accompanied by an opposite-sign and half-magnitude change in the second volume. That is, in the second counter-motion mode, when first needle 112 is used to inject a first amount of medicament, an amount of fluid equal to half of the first amount is withdrawn using second needle 114. The second counter-motion mode may be used for injecting into an eye with low intraocular pressure.

According to some embodiments, in cases where injection and withdrawal are performed essentially simultaneously, the length of first needle 112 may be different from the length of second needle 114 (not shown) such that each needle will reach a different location within the eye.

According to some embodiments, syringe 100 may operate in a free-motion mode, wherein motions of first plunger 122 and second plunger 124 are independent of one another.

According to some embodiments, syringe 100 may operate in a restricted-motion mode. According to some embodiments, syringe 100 includes a locking mechanism facilitating such operation. According to some embodiments, the locking mechanism is configured to allow first plunger 122 to be pushed (to inject fluid) only upon indication that second plunger 124 was shifted to a pulled configuration (to ensure that fluid was drawn from the eye prior to injection) and/or vice-versa (switching between the roles of the first and second plungers).

Additionally or alternatively, the locking mechanism may be configured to allow first plunger 122 to be pulled (to withdraw eye fluid) only upon indication that second plunger 124 was shifted to a pushed configuration (to ensure that fluid was injected into the eye prior to withdrawal) and/or vice-versa (switching between the roles of the first and second plungers).

According to some embodiments, syringe 100 is configured such that in the second configuration needles 112 and 114 (distally) can only project to a pre-determined extent relative to distal rim 142. According to some embodiments, the pre-determined extent is about 1 cm. The pre-determined extent is selected such as to guarantee, on the one hand, (i) safety of use of syringe 100 as a too deep insertion of a needle into the eye may damage/injure internal structures of the eye such as the retina, and, on the other hand, (ii) sufficiently deep insertion of needles 112 and 114, thereby ensuring penetration of all of the layers constituting the outer surfaces of the eye.

According to some embodiments, syringe 100 is configured to allow insertion of needles 112 and 114 into an eye of a subject at a pre-determined speed and/or pressure or at pre-determined range of speeds and/or pressures. This may help to reduce the discomfort experienced by the subject, particularly when a needle(s) is introduced into the eye too quickly or too slowly and/or with too much or too little force applied.

According to some embodiments, syringe 100 includes at least one additional lumen (not shown) longitudinally disposed about first lumen 102. According to some such embodiments, syringe 100 further includes at least one additional needle (not shown) longitudinally disposed about first needle 112. Additionally or alternatively, according to some embodiments, syringe 100 includes at least one additional lumen (not shown) longitudinally disposed inside second lumen 104. According to some such embodiments, syringe 100 further includes at least one additional needle (not shown) longitudinally disposed inside second needle 114.

Figure 3:
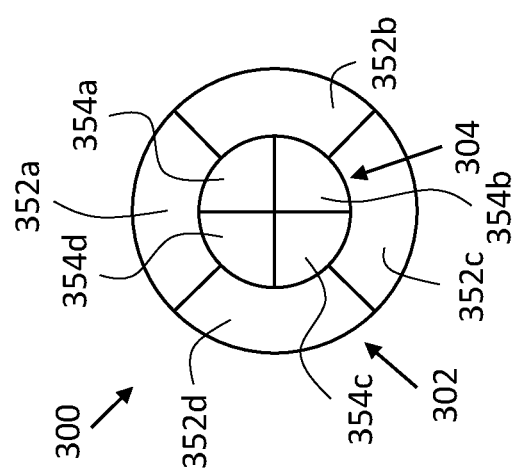
FIG. 3 is a cross-sectional view of lumens of a multi-lumen syringe, according to some embodiments.

FIG. 3 is a schematic cross-sectional view of a multi-lumen syringe 300, according to some embodiments. Syringe 300 is similar to syringe 100 but differs therefrom in that at least one of a first lumen 302 and a second lumen 304 thereof includes a plurality of sub-lumens extending longitudinally there along. More specifically, FIG. 3 is a schematic cross-sectional view of first lumen 302 and second lumen 304. According to some embodiments, and as depicted in FIG. 3, first lumen 302 is partitioned into a plurality of first lumen sub-lumens 352 extending in parallel to one another, and second lumen 304 is partitioned into a plurality of second lumen sub-lumens 354 extending in parallel to one another. According to some embodiments, each of first lumen sub-lumens 352 is fluidly connected to a first needle (not shown; similar to first needle 112) and each of second lumen sub-lumens 354 is fluidly connected to a second needle (not shown; similar to second needle 114).

As a non-limiting and illustrative example, in FIG. 3, first lumen 302 includes four sub-lumens (a sub-lumen 352a, a sub-lumen 352b, a sub-lumen 352c, and a sub-lumen 352d) and second lumen 304 includes four sub-lumens (a sub-lumen 354a, a sub-lumen 354b, a sub-lumen 354c, and a sub-lumen 354d).

According to some embodiments, syringe 300 includes a first plurality of plungers and a second plurality of plungers (not shown). Each plunger in the first plurality may be associated with a respective sub-lumen from first lumen sub-lumens 352. Each plunger in the second plurality may be associated with a respective sub-lumen from second lumen sub-lumens 354.

More generally, according to some embodiments, some of first lumen sub-lumens 352 and/or second lumen sub-lumens 354 may be associated with a common plunger, while other of first-lumen sub-lumens 352 and/or second lumen sub-lumens 354 may not be associated with a common plunger, being instead associated with a unique respective plunger.

According to some embodiments, syringe 300 includes one or more additional needles (not shown), such that some of first lumen sub-lumens 352 and/or some of second lumen sub-lumens 354 are fluidly associated with the one or more additional needles.

Figure 4:
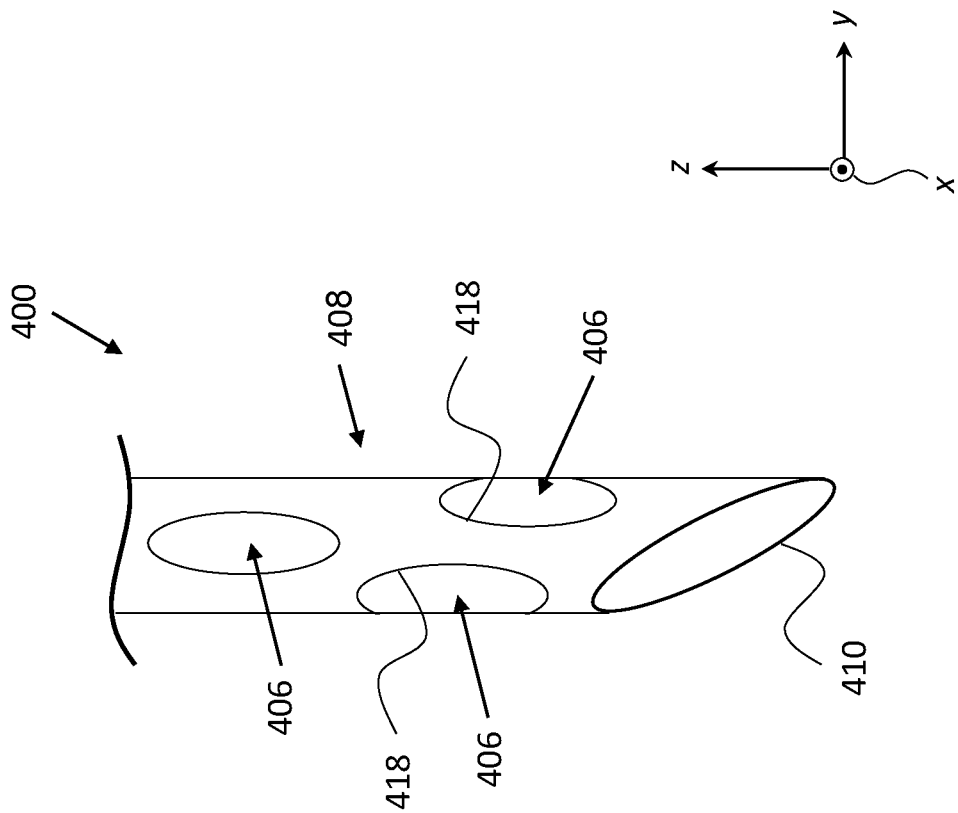
FIG. 4 is a schematic partial view of a fenestrated needle, according to some embodiments.

FIG. 4 is a schematic partial view of a fenestrated needle 400, according to some embodiments. Fenestrated needle 400 includes one or more side ports 406 along a shaft 408 of fenestrated needle 400. Side ports 406 may be, for example, circular, elliptical (as depicted in FIG. 4), or even rectangular. According to some embodiments, side ports 406 may differ from one another in shape and/or in size (e.g. in the length of the principle axis when side ports 406 are elliptical). Side ports 406 may also differ from one another in the positionings thereof along shaft 408. In particular, different side ports (from side ports 406) may differ from one another in respective distances thereof from a (distal) tip 410 of shaft 408, and/or may be located opposite, or substantially opposite, to one another (i.e. on opposite walls of shaft 408).

According to some embodiments, side ports 406 may be located on a distal portion of shaft 408, such as to help ensure that side ports 406 are positioned within the vitreous when fenestrated needle 400 is properly inserted into an eye of a subject, and thereby increase the safety of the procedure.

According to some embodiments, side ports 406 may further function as cutting elements, since motion of fenestrated needle 400 within the eye may result in the cutting of substances in the eye that come into contact with side ports 406. The motion may include longitudinal motion (e.g. reciprocating motion), transverse motion (e.g. back-and-forth motion on the yz-plane wherein the needle remains parallel to the z-axis throughout), rotations (about the z-axis and/or about the negative z-axis), vibrations, and/or a combination thereof. According to some embodiments, one or more of the listed motions may be oscillatory. According to some embodiments, the motions may be generated by a mechanical (pressure based), electrical, electromagnetic, electro-mechanic, or a piezo-electric motor (not shown), which may be housed, for example, in a lumen to which fenestrated needle 400 is fluidly-connected. According to some such embodiments, rims 418 of side ports 406 may be sharp (e.g. similarly to an edge of a razor blade) in order to increase the cutting efficacy of side ports 406.

Since (vitreous) fluid may be disposed in liquefied vitreous lacunae, the inclusion of side ports 406 (in addition to the port defined by tip 410) increases the likelihood of drawing fluid from the vitreous. More specifically, since the vitreous fluid does not form a single body of fluid within the vitreous, the addition of a plurality of side ports, which are distributed along the length of the needle shaft, increases the likelihood of the needle (when inserted into vitreous) establishing fluid-communication with more than a single body of fluid. Further, as mentioned above, side ports 406 may further act as a cutting elements, thereby potentially freeing fluid from lacunae positioned around fenestrated needle 400, which may then be withdrawn via side ports 406.

According to some embodiments, a fenestrated needle having no hole at the tip thereof (not shown) may also be applied. Such fenestrated needle includes only side ports similar to side ports 406 of fenestrated needle 400. Since such needle has no hole at the tip thereof, the tip may have a smaller diameter and can, thus, advantageously be very sharp.

Making reference again to syringe 100, according to some embodiments, not depicted in the figures, first needle 112 is fenestrated in an essentially similar manner to fenestrated needle 400 or to the fenestrated needle described hereinabove. Additionally or alternatively, second needle 114 may be fenestrated.

Making reference again to syringe 300, according to some embodiments, not depicted in the figures, a first needle of syringe 300 (i.e. the outer needle of syringe 300 which may be fluidly-connected to first lumen sub-lumens 352) is fenestrated, in an essentially similar manner to fenestrated needle 400 or to the fenestrated needle described hereinabove. Additionally or alternatively, a second needle of syringe 300 (i.e. the inner needle of syringe 300 which may be fluidly-connected to second lumen sub-lumens 354) may be fenestrated.

According to some embodiments, there is provided a multi-lumen syringe. The syringe may be similar to embodiments of syringe 100 or syringe 300 including a fenestrated needle such as fenestrated needle 400 (or the fenestrated needle described hereinabove) but differs therefrom in not including at least one of a needle sheath (e.g. such as needle sheath 140) and actuators such as actuators 148 or similar thereto.

Figure 5:
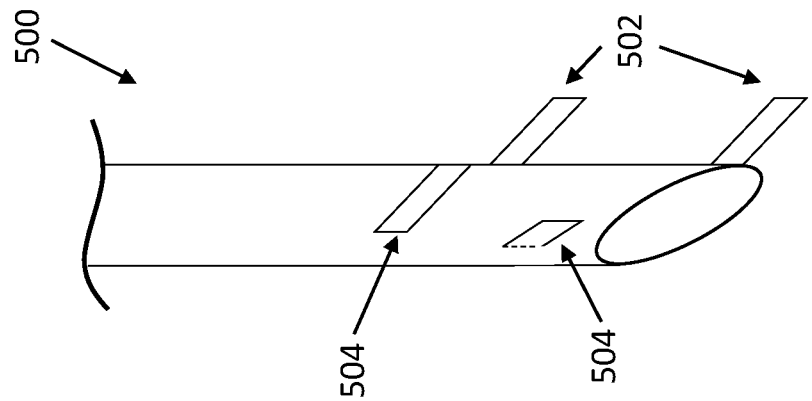
FIG. 5 is a schematic partial view of a needle including one or more cutting elements, according to some embodiments.

FIG. 5 is a schematic partial view of a needle 500 including cutting elements, according to some embodiments. Needle 500 includes one or more external cutting elements 502 and/or one or more internal cutting elements 504. Motion of needle 500 within the eye may result in the cutting of substances therein which come into contact with cutting elements 502. The motion may include longitudinal motion (e.g. reciprocating motion), transverse motion, rotations, vibrations, and/or a combination thereof. According to some embodiments, one or more of the listed motions may be oscillatory. According to some embodiments, the motions may be generated by a mechanical (pressure based), electrical, electromagnetic, electro-mechanic, or a piezo-electric motor (not shown), which may be housed, for example, within needle 500 or within a lumen to which needle 500 is fluidly-connected.

Making reference again to syringe 100, according to some embodiments, not depicted in the figures, second needle 114 includes one or more external cutting elements, such as external cutting elements 502, and/or one or more internal cutting elements, such as internal cutting elements 504. Additionally or alternatively, according to some embodiments, first needle 112 includes one or more internal cutting elements. Optionally, first needle 112 may include one or more external cutting elements.

Making reference again to syringe 300, according to some embodiments, not depicted in the figures, the inner needle of syringe 300 includes one or more external cutting elements, such as external cutting elements 502, and/or one or more internal cutting elements, such as internal cutting elements 504. Additionally or alternatively, according to some embodiments, the outer needle of syringe 300 includes one or more internal cutting elements. Optionally, the outer needle of syringe 300 may include one or more external cutting elements.

According to some embodiments, there is provided a multi-lumen syringe. The syringe may be similar to embodiments of syringe 100 or syringe 300 including a needle with cutting elements needle such as needle 500 but differs therefrom in not including at least one of a needle sheath (e.g. such as needle sheath 140) and actuators such as actuators 148 or similar thereto.

Figure 6:
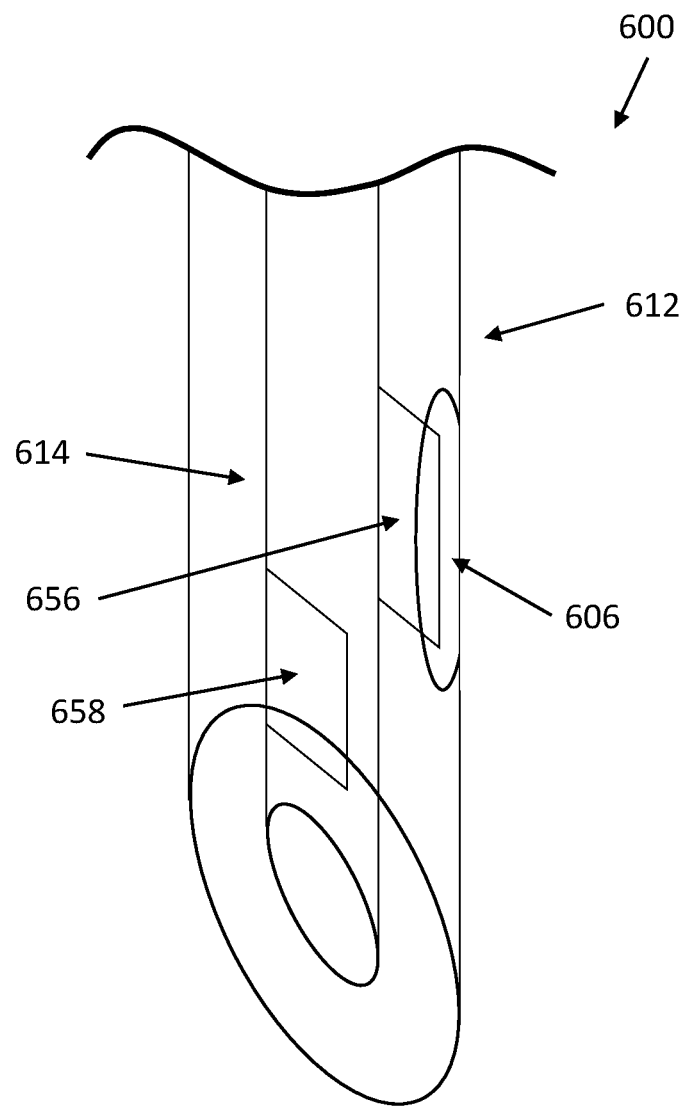
FIG. 6 is a schematically partial view of a double-needle syringe, wherein each of the needles is fenestrated and/or includes cutting elements, according to some embodiments.

FIG. 6 is a schematic partial view of a double-needle assembly 600, according to some embodiments. Double-needle assembly 600 includes a first needle 612 and a second needle 614. According to some embodiments, and as depicted in FIG. 6, second needle 614 is disposed within and along first needle 612. According to some embodiments, first needle 612 is fenestrated in an essentially similar manner to fenestrated needle 400. Additionally and/or alternatively, according to some embodiments, second needle 614 includes one or more external cutting elements, such as at least one external cutting element 656, and/or one or more internal cutting elements, such as at least one internal cutting elements 658. Additionally or alternatively, according to some embodiments, second needle 614 is fenestrated. Optionally, first needle 612 may include one or more internal and/or external cutting elements.

As a non-limiting example, and as depicted in FIG. 6, first needle 612 may include one or more ports 606 (such as one or more of ports 406), and second needle 614 may include at least one external cutting element 656 (such as one or more of external cutting elements 502) and at least one internal cutting element 658 (such as one or more of internal cutting elements 504). In some embodiments, one or more of at least one external cutting element 656 may be located at or proximal to one or more ports 606 enabling cutting of elements from the vitreous to enter through ports 606 or through the needle tip of the second lumen. In addition, in some embodiments, the internal cutting elements may be positioned on the first and/or second lumen and may cut elements from the vitreous entering though the needle tip.

According to some embodiments, double-needle assembly 600 may be configured to allow executing relative motion between first needle 612 and second needle 614, for example: (i) longitudinal reciprocating relative motion (wherein first needle 612 moves in a reciprocating manner while second needle 614 is stationary, second needle 614 moves in a reciprocating manner while first needle 612 is stationary, or wherein first needle 612 and second needle 614 move at different speeds, e.g. in opposite directions), (ii) transverse relative motion, (iii) relative rotational motion (wherein first needle 612 and second needle 614 rotate about the z-axis at different angular velocities, e.g. in opposite senses).

Making reference again to syringe 100, according to some embodiments, not depicted in the figures, wherein first needle 112 and/or second needle 114 are fenestrated (as described above) and/or include cutting elements (as described above), first needle 112 and second needle 114 are arranged in a double-needle configuration essentially similarly to first needle 612 and second needle 614 of double-needle assembly 600. In particular, first needle 112 and/or second needle 114 may be configured to realize relative motion there between as described above with respect to first needle 612 and second needle 614. According to some such embodiments, syringe 100 may be configured such that pushing and/or pulling one or both of first plunger 122 and second plunger 124 actuates motion of the cutting elements (e.g. actuates vibration thereof). Additionally and/or alternatively, syringe 100 may be configured such that pushing and/or pulling one or both of first plunger 122 second plunger 124, generates relative motion between first needle 112 and second needle 114 (e.g. relative longitudinal motion there between), thereby inducing motion (or additional motion) of the cutting elements.

Making reference again to syringe 300, according to some embodiments, not depicted in the figures, wherein the outer needle thereof (i.e. of syringe 300) and/or the inner needle thereof are fenestrated (as described above) and/or include cutting elements (as described above), the outer needle and the inner needle are arranged in a double-needle configuration essentially similarly to first needle 612 and second needle 614 of double-needle assembly 600. In particular, the outer needle and/or the inner needle (of syringe 300) may be configured to realize relative motion there between as described above with respect to first needle 612 and second needle 614. According to some such embodiments, syringe 300 may be configured such that pushing and/or pulling of one or more of the plungers of syringe 300 actuates motion of the cutting elements. Additionally and/or alternatively embodiments, syringe 300 may be configured such that pushing and/or pulling one or more of the plungers of syringe 300, generates relative motion between outer needle and the inner needle, thereby inducing motion (or additional motion) of the cutting elements.

According to some embodiments, there is provided a multi-lumen syringe. The syringe may be similar to embodiments of syringe 100 or syringe 300 including a double-needle assembly such as double-needle assembly 600 but differs therefrom in not including at least one of a needle sheath (e.g. such as needle sheath 140) and actuators such as actuators 148 or similar thereto.

According to some embodiments, there is provided a multi-lumen syringe. The syringe may be similar to syringe 100 or to syringe 300 but differs therefrom in including only a single needle similar to either first needle 112, fenestrated needle 400, or needle 500 or another needle configuration described herein above. Both a first lumen and a second lumen of the syringe (which are similar to first lumen 102 and second lumen 104, respectively, or to first lumen 302 and second lumen 304, respectively) are fluidly associated with the needle.

Figure 7:
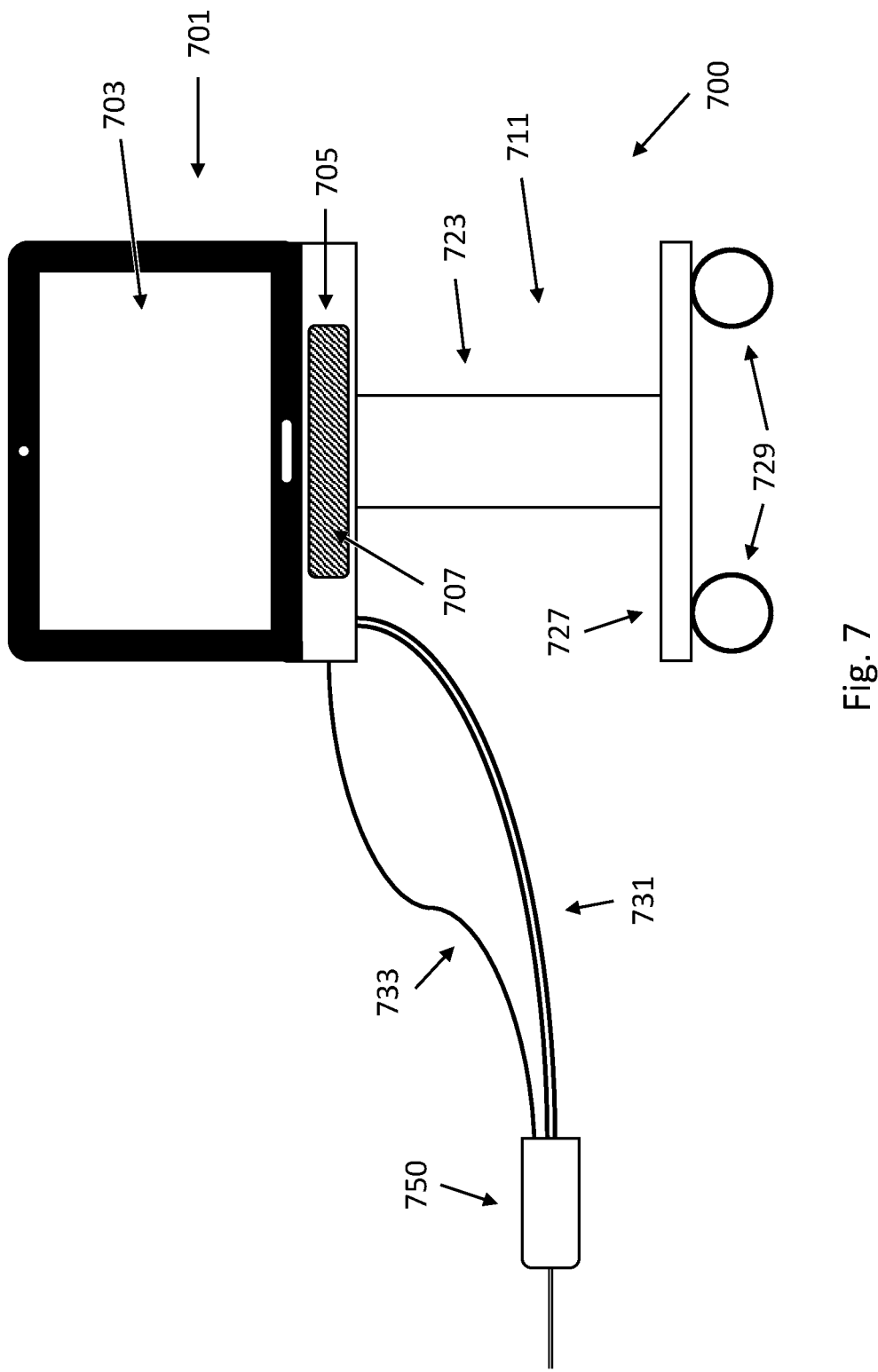
FIG. 7 schematically depicts a station for injecting fluid into, and/or drawing fluid from, an eye of a subject, according to some embodiments.

FIG. 7 schematically depicts a station 700 for injecting into, and/or drawing fluids from, an eye of a subject, according to some embodiments. Station 700 is configured to be used with a syringe 750, which is functionally associated with station 700. More specifically, according to some embodiments, station 700 may be configured to control operation of at least of some functions of syringe 750, such as, for example, a rate of injection(s). According to some embodiments, syringe 750 may be a multi-lumen syringe, such as multi-lumen syringe 100, multi-lumen syringe 300, the other multi-lumen syringes described herein above, and multi-lumen syringes similar thereto. According to some embodiments, syringe 750 may be a multi-lumen syringe similar to multi-lumen syringes 100 and 300 but differing therefrom in not including at least one of a needle sheath (e.g. such as needle sheath 140) and actuators such as actuators 148 or similar thereto. According to some alternative embodiments, syringe 750 may include only a single lumen, as elaborated on below.

According to some embodiments, station 700 includes a housing 701, which includes a monitor 703. Station 700 may further include a user operated controller 705. According to some embodiments, controller 705 is included in housing 701, for example, and as depicted in FIG. 7, in the form of a control panel 707 (e.g. a touch panel). A control circuitry (not shown) may be distributed between controller 705 and other parts of housing 701. The control circuitry (e.g. electronic circuitry, one or more computer processors and memory components) is configured to allow a user to operate/control functions of syringe 750 using controller 705. The control circuitry is further configured to control operation of monitor 703, and so on.

According to some embodiments, controller 705 may be detachably mounted on housing 701 (e.g. on a docking station which may be included as part of housing 701) and may be used both when docked and as a handheld device. According to some embodiments, controller 705 may include control panel 707, as well as one or more additional control accessories (not shown; which may control different functions from control panel 707), such as a foot pedal which may be configured to e.g. allow a user to control rate(s) of injection.

According to some embodiments, station 700 may further include a support structure 711 on which housing 701 may be mounted. According to some embodiments, support structure 711 includes a height-adjustable mount 723, whereon housing 701 may be mounted, and a base 727, which supports mount 723. According to some embodiments, station 700 is mobile. According to some such embodiments, base 727 is mounted on a mechanism which facilitates moving of station 700, such as wheels 729. According to some alternative embodiments, station 700 may be stationary.

As depicted in FIG. 7, housing 701 is configured to be fluidly coupled to syringe 750 via one or more tubes 731 (pipes) and/or one or more wires 733 (e.g. electrical wires and/or optical fibers). According to some embodiments, tubes 731 and wires 733 are detachably connectable to housing 701. According to some such embodiments, tubes 731, and optionally wires 733, are disposable, and may be replaced after each use. According to some embodiments, syringe 750 is disposable and may be replaced after each use. According to some embodiments, components of syringe 750, for example, a plunger(s), a lumen(s), and a needle(s) are disposable and may be replaced after each use, thereby minimizing the contamination of instruments/components due to a patient (subject). According to some such embodiments, syringe 750 may arrive "out of the box" connected to tubes 731, and optionally to wires 733. According to some embodiments, not depicted in FIG. 7 tubes 731 and wires 733 are disposed within a single cable. According to some embodiments, wires 733, and optionally tubes 731, and form part of station 700, and are detachably connectable to syringe 750.

It will be understood that syringe 750 may be a multi-lumen syringe and, in particular, an embodiment of multi-lumen syringe 100, multi-lumen syringe 300, each of the other multi-lumen syringes described hereinabove, or similar thereto. Each possibility corresponds to different embodiments. Different embodiments of tubes 731 may vary from one another in accordance with the multi-lumen syringe to which they are configured to be connected. For example, the number of tubes (in tubes 731) may vary in accordance with the number of lumens or sub-lumens in the multi-lumen syringe. In particular, according to some embodiments, the number of tubes may equal the number of lumens or the numbers of sub-lumens in the multi-lumen syringe to which they are intended to be respectively connected. Similarly, different embodiments of wires 733 may vary from one another in accordance with the multi-lumen syringe to which they are configured to be connected (e.g. in accordance with the number of plungers in the multi-lumen syringe).

According to some embodiments, operational parameters of syringe 750 may be controlled via controller 705, controller accessories (such as a foot pedal), and/or buttons and/or the like on tubes 731, wires 733, and/or syringe 750. As a non-limiting example, the operational parameters may include a volume of injected/withdrawn fluid, a force applied to insert a needle, a speed of insertion of needle, a rate of injection/fluid withdrawal, which lumens are operational and which are not (e.g. are blocked) during a use of the syringe 750 (i.e. controller 705 can be used "enable" and "disable" lumens), which lumen is to be used for injection and which lumen is to be used for withdrawal, and so on.

According to some embodiments, wherein syringe 750 includes a needle assembly, such as double-needle assembly 600, or similar thereto, relative motion of the needles (including the type of motion, e.g. longitudinal or rotational, the speed of motion) may be initiated/selected/controlled via controller 705, controller accessories, and/or buttons and/or the like on tubes 731, wires 733, and/or syringe 750. According to some embodiments, wherein a needle of syringe 750 includes cutting elements, such as cutting elements 502 and/or 504, motion of the cutting elements may be initiated/selected/controlled via controller 705, controller accessories, and/or buttons and/or the like on tubes 731, wires 733, and/or syringe 750.

According to some embodiments, tubes 731 and/or wires 733 may be functionally associated with one or more plungers of the syringe, one or more lumens and/or sub-lumens of the syringe, one or more components within the lumens and/or sub-lumens (such as motors to generate motion of the needles, motors to generate motion of the plungers, to apply positive or negative pressure to pneumatically mobilize the plungers, and/or to the substance in the lumens and/or to the needle(s)), one or more needles of the syringe, and/or one or more components within and/or on the needles (such as cutting elements), thereby functionally associating station 700 (i.e. the control circuitry in station 700) therewith.

According to some embodiments, station 700 may be configured to control the pressures in the lumens of syringe 750 (and in the sub-lumens in embodiments wherein the lumens of syringe 750 include sub-lumens). In particular, station 700 may be configured to generate positive and negative pressures within the lumens, to control the rates of change in the pressures, and thereby control the rates of fluid injections into the eye and fluid withdrawals therefrom. According to some embodiments, station 700 is configured to control the motion of the plungers and thereby control the pressures and rates of change thereof in the lumens of the syringe. According to some embodiments, station 700 may include a pump, which is mechanically coupled to the lumens in the syringe via tubes 731. According to some embodiments, the motion of plungers is controlled by the pump.

According to some embodiments, syringe 750 is a single-lumen syringe. According to some such embodiments, tubes 731 include two tubes which may effectively assume the role of the lumens in syringe 100, with a first of the two tubes being fluidly connected to first lumen 102 and the second of the two tubes being fluidly connected to second lumen 104. Similarly, according to some embodiments wherein syringe 750 is a single-lumen syringe, tubes 731 include, or consist of, a single double-lumened tube which may effectively assume the role of the lumens in syringe 100.

According to some embodiments in which syringe 750 is a single-lumen syringe, tubes 731 include a plurality of tubes which may effectively assume the role of the sub-lumens in syringe 300. According to some such embodiments, some of the tubes may be multi-lumened. Similarly, according to some embodiments wherein syringe 750 is a single-lumen syringe, tubes 731 include, or consist of, a single multi-lumened tube which may effectively assume the role of the lumens in syringe 100.

According to some embodiments, the control circuitry may include processing circuitry configured to analyze sensor readings from sensors positioned in syringe 750 (e.g. in one of the lumens used for drawing eye-fluid), in one or more tubes 731, and/even in housing 701. For example, according to some embodiments, wires 733 may include one or more optical fibers connected to a CCD sensor or a CMOS sensor in housing 701. In such embodiments, the processing circuitry may be configured to analyze image data from within the eye or of fluids within the lumens/sub-lumens. Alternatively, the optical sensors (e.g. the CMOS sensor) may be included in the syringe. The processing circuitry may include at least one computer processor and a memory configured to store analysis results. According to some embodiments, the computer processor may be configured to provide a diagnosis based on the analysis results. According to some embodiments, the processing and/or memory storage, and/or analysis of results may be performed in a remote central location (e.g. server). Such remote central location (e.g. server) is configured to receives and analyze results obtained from one or more stations such as station 700. According to some embodiments, monitor 703 may be configured to display the analysis results (and the diagnosis in embodiments wherein a diagnosis is provided).

According to some embodiments, housing 701 may include a compartment configured to house one or more removable fluid containers (not shown). The containers may be fluidly connectable to tubes 731, which in turn may be fluidly connected to the lumens in syringe 750, thereby allowing to fluidly couple the lumens to the containers. In such embodiments, a fluid intended for injection may be stored in a respective container in station 700. Other containers may be intended for fluid withdrawal and may initially be empty (i.e. prior to a use of station 700) or may include a substance configured to interact with withdrawn fluid. According to some embodiments, containers including withdrawn fluid may be removed for lab analysis. According to some embodiments, station 700 may include equipment configured to analyze the withdrawn fluid or at least to provide an initial analysis thereof. According to additional/alternative embodiments, station 700 may include equipment configured to transmit and/or receive readings to/from a remote central location (e.g. server or servers).

According to some embodiments, housing 701, one or more of tubes 731, and/or syringe 750 may include at least one substance facilitating rapid analysis of eye-fluid through an interaction of the substance with the eye-fluid.

According to some embodiments, monitor 703 may be configured to display analyzed data from rapid analysis of eye-fluid in a qualitative, semi-quantitative, and/or quantitative format.

According to some embodiments, syringe 750 may be an embodiment of a syringe known in the art. According to some embodiments, syringe 750 may be made of parts described in FIGS. 1-6, including but limited to the plungers, lumens, sub-lumens, and needles in a multi-lumen needle formation, a single needle formation, or any combination of needles 112, 114, 400, and 500, and double-needle assembly 600.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although steps of methods according to some embodiments may be described in a specific sequence, methods of the disclosure may include some or all of the described steps carried out in a different order. A method of the disclosure may include a few of the steps described or all of the steps described. No particular step in a disclosed method is to be considered an essential step of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A multi-lumen syringe for intraocular injection to and/or for intraocular substance withdrawal from an eye of a subject, the syringe comprising a first lumen, a second lumen, a needle fluidly connectable to the first lumen and to the second lumen, a first plunger configured for reciprocal motion within the first lumen, and a second plunger configured for reciprocal motion within the second lumen,
   wherein:
   the syringe is configured for drawing and/or injecting 0-0.4 ml;
   the needle comprises one or more internal or external cutting elements added thereon, configured for cutting vitreous substances in the eye which come into contact with the cutting elements prior to withdrawal thereof from the subject eye; and
   the syringe further comprises a locking mechanism configured to prevent the second plunger from being pushed when a volume defined by the first plunger within the first lumen is smaller than a threshold volume.

2. The multi-lumen syringe of claim 1, further comprising a needle sheath which comprises at least three actuators on a distal rim of the needle sheath;
   wherein
   the at least three actuators are at least three contact actuators or at least three pressure actuators; and
   the syringe is switchable between at least two configurations:
   a first configuration in which at least one of the actuators is not actuated and each tip of the needle is proximally positioned, and secured, relative to the distal rim; and a second configuration in which the at least three actuators are actuated, and the needle distally extendible beyond the distal rim.

3. The multi-lumen syringe of claim 2, wherein a plane defined by the distal rim of the needle sheath is perpendicular, or substantially perpendicular, to the needle, thereby ensuring that when all, or substantially all, of the distal rim contacts a surface of an eye such as to actuate the at least three actuators, the needle is insertable perpendicularly to the surface of the eye.

4. The multi-lumen syringe of claim 3, wherein the syringe is configured to automatically switch back from the second configuration to the first configuration, thereby ensuring that, after insertion of the needle, if the syringe is tilted such that the distal rim no longer fully or substantially fully contacts the surface of the eye, injection or withdrawal of fluids is no longer possible.

5. The multi-lumen syringe of claim 1, further comprising a needle sheath, and:
   a) the needle sheath comprises a distal rim having a radius of about 3-4 mm; and/or
   b) the needle sheath comprises a circumferential flange or band which defines a distance of about 3-4 mm from the needle,
   thereby facilitating insertion of the needle about 3-4 mm from the eye limbus.

6. The multi-lumen syringe of claim 2, wherein respective distances between adjacent actuators of the at least three actuators are equal or substantially equal.

7. The multi-lumen syringe of claim 1, wherein the syringe further comprises a needle sheath which is retractable and/or compressible and wherein the needle is fixed.

8. The multi-lumen syringe of claim 1, wherein the locking mechanism is configured to allow the first plunger to be pushed only upon indication that the second plunger was shifted to a pulled configuration and/or the second plunger to be pushed only upon indication that the first plunger was shifted to a pulled configuration, thereby ensuring eye fluid withdrawal prior to injection.

9. The multi-lumen syringe of claim 1, further comprising at least one substance facilitating rapid analysis of eye-fluid through an interaction of the substance with the eye-fluid.

10. The multi-lumen syringe of claim 9, wherein the at least one substance is located in the lumen(s)/sub-lumen(s) of the syringe.

11. The multi-lumen syringe of claim 9, wherein the rapid analysis comprises Enzyme-Linked Immunosorbent Assay (ELISA).

12. The multi-lumen syringe of claim 1, wherein motion of the needle within the eye results in cutting vitreous substances that come into contact with the cutting elements.

13. The multi-lumen syringe of claim 1, wherein the multi-lumen syringe is configured to allow the first plunger to be pushed only upon indication that the second plunger was shifted to a pulled configuration and/or the second plunger to be pushed only upon indication that the first plunger was shifted to a pulled configuration, thereby ensuring eye fluid withdrawal prior to injection.

14. The multi-lumen syringe of claim 1, wherein the needle has a size of 27-31 gauge.

15. The multi-lumen syringe of claim 1, wherein the syringe is configured for drawing and/or injecting 0.05-0.4 ml.

16. The multi-lumen syringe of claim 1, further comprising a controller configured to control a volume or a rate of injected/withdrawn fluid.

17. The multi-lumen syringe of claim 1, further comprising a disposable syringe lumen or sub-lumen.

18. A method for intraocular fluid injection to and/or for intraocular substance withdrawal from an eye of a subject, the method comprising:
   utilizing a multi lumen syringe comprising a first lumen, a second lumen, a needle fluidly connected to the lumens and comprising one or more external or internal cutting elements added thereon, a first plunger, and a second plunger, wherein the syringe is configured for drawing and/or injecting 0-0.4 ml and further comprises a locking mechanism configured to prevent the second plunger from being pushed when a volume defined by the first plunger within the first lumen is smaller than a threshold volume;
   contacting the eye with a distal tip of the syringe;
   inserting the needle into the eye and utilizing the one or more cutting elements added onto the needle for cutting of vitreous substances in the eye and facilitating withdrawal of fluid from the eye;
   pulling the first plunger of the syringe to withdraw 0-0.4 ml of fluid from the eye into the first lumen; and
   pushing the second plunger of the syringe to inject 0-0.4 ml of fluid from the second lumen into the eye.

19. The method of claim 18, wherein further comprising utilizing at least one substance present in the syringe, performing a rapid analysis of eye-fluid through an interaction of the substance with the eye-fluid.

\* \* \* \* \*